US 7,384,183 B2

(12) United States Patent
Smith (10) Patent No.: US 7,384,183 B2
(45) Date of Patent: Jun. 10, 2008

(54) MOBILE DECONTAMINATION UNIT

(75) Inventor: Richard Lee Smith, Overland Park, KS (US)

(73) Assignee: Global Ground Support, LLC, Olathe, KS (US)

( * ) Notice: Subject to any disclaimer, the term of this patent is extended or adjusted under 35 U.S.C. 154(b) by 218 days.

(21) Appl. No.: 10/656,462

(22) Filed: Sep. 5, 2003

(65) Prior Publication Data

US 2004/0057336 A1  Mar. 25, 2004

Related U.S. Application Data

(60) Provisional application No. 60/408,758, filed on Sep. 6, 2002, provisional application No. 60/420,857, filed on Oct. 24, 2002.

(51) Int. Cl.
*B01F 15/04* (2006.01)
*F04B 23/04* (2006.01)

(52) U.S. Cl. .............. 366/162.1; 366/181.8; 366/182.2; 417/426; 417/429

(58) Field of Classification Search ............ 366/160.1, 366/160.2; 417/429, 16, 17, 216, 423.5, 417/426; 137/565.31, 565.33; 475/6
See application file for complete search history.

(56) References Cited

U.S. PATENT DOCUMENTS

| | | | | | |
|---|---|---|---|---|---|
| 2,244,106 | A | * | 6/1941 | Granberg et al. | 417/429 |
| 2,627,453 | A | * | 2/1953 | Sheen | 422/76 |
| 2,638,847 | A | * | 5/1953 | McGowan | 417/429 |
| 2,821,698 | A | * | 1/1958 | Richardson | 340/681 |
| 3,074,649 | A | * | 1/1963 | Atkinson | 239/165 |
| 3,124,270 | A | * | 3/1964 | Cornell | 417/429 |
| 3,250,218 | A | * | 5/1966 | Sinclair | 417/216 |
| 3,359,910 | A | * | 12/1967 | Latham, Jr. | 417/426 |
| 3,565,286 | A | * | 2/1971 | Latham, Jr. | 222/4 |
| 3,723,026 | A | * | 3/1973 | Soyland et al. | 417/286 |
| 3,817,658 | A | * | 6/1974 | Murase | 417/2 |
| 3,909,197 | A | * | 9/1975 | Cremers | 8/158 |
| 3,957,203 | A | * | 5/1976 | Bullard | 239/128 |
| 3,985,472 | A | * | 10/1976 | Virtue et al. | 417/216 |
| 4,158,529 | A | * | 6/1979 | Nonnemacher et al. | 417/216 |
| 4,220,170 | A | * | 9/1980 | Hebert et al. | 134/167 R |
| 4,234,007 | A | * | 11/1980 | Titone et al. | 137/101.19 |
| 4,341,508 | A | * | 7/1982 | Rambin, Jr. | 417/426 |
| 4,474,680 | A | * | 10/1984 | Kroll | 516/10 |
| 4,750,843 | A | | 6/1988 | Endtner et al. | |
| 4,805,653 | A | * | 2/1989 | Krajicek et al. | 134/166 C |
| 4,812,046 | A | * | 3/1989 | Henderickson | 366/111 |
| 4,847,928 | A | | 7/1989 | Fey | |
| 5,004,156 | A | * | 4/1991 | Montanier | 239/130 |
| 5,104,068 | A | * | 4/1992 | Krilla et al. | 244/134 R |
| 5,165,862 | A | * | 11/1992 | Lindblom | 417/216 |
| 5,174,730 | A | * | 12/1992 | Nieuwkamp et al. | 417/366 |

(Continued)

*Primary Examiner*—Tony G Soohoo
(74) *Attorney, Agent, or Firm*—Summa, Allen & Additon, P.A.

(57) ABSTRACT

An apparatus capable of mixing and dispensing a decontaminant foam that is useful in strategic and tactical decontamination comprises in one embodiment a plurality of tanks 11, a pump assembly that is capable of mixing binary or multi-component decontaminant fluids in a desired ratio, and a manifold for mixing the fluids. In an alternative embodiment, the invention provides a mobile decontamination module, wherein a wheeled platform is provided for supporting the tanks 11, pump assembly, manifold, and a boom for dispensing foam-based of liquid-based decontaminant such that the module is compatible with the on-load and off-load equipment aboard a heavy transport vehicle.

28 Claims, 8 Drawing Sheets

U.S. PATENT DOCUMENTS

| | | | |
|---|---|---|---|
| 5,176,504 A * | 1/1993 | Moriya et al. | 417/216 |
| 5,192,509 A * | 3/1993 | Surjaatmadja et al. | 422/75 |
| 5,194,095 A * | 3/1993 | Yates | 134/10 |
| 5,314,096 A | 5/1994 | Fesl et al. | |
| 5,358,568 A * | 10/1994 | Okano et al. | 118/323 |
| 5,398,733 A * | 3/1995 | Welch | 141/4 |
| 5,433,380 A * | 7/1995 | Hahn | 239/62 |
| 5,482,441 A * | 1/1996 | Permar | 417/216 |
| 5,502,685 A * | 3/1996 | Orlando | 366/132 |
| 5,522,660 A * | 6/1996 | O'Dougherty et al. | 366/136 |
| 5,702,536 A * | 12/1997 | Carruth | 134/10 |
| 5,759,277 A * | 6/1998 | Milovich et al. | 118/629 |
| 5,980,836 A * | 11/1999 | Moffett et al. | 366/160.2 |
| 6,525,237 B1 * | 2/2003 | Purdon et al. | 588/317 |
| 6,554,207 B2 * | 4/2003 | Ebberts | 239/146 |

* cited by examiner

MOBILE DECONTAMINATION UNIT

CROSS-REFERENCE TO RELATED APPLICATION

This application is a continuation-in-part of now abandoned U.S. provisional application Ser. No. 60/408,758, for Apparatus for Mixing and Dispensing a Foam-based Decontaminant, which was filed Sep. 6, 2002, and now abandoned U.S. provisional application Ser. No. 60/420,857, for Apparatus for Mixing and Dispensing a Foam-based Decontaminant, which was filed Oct. 24, 2002, both of which are herein incorporated by reference in their entirety.

FIELD OF THE INVENTION

The invention relates to an apparatus for mixing and dispensing a foam-based or liquid-based decontaminant. In particular, the invention relates to an apparatus capable of mixing a binary or multi-component liquid decontaminant and dispensing a decontaminant foam or liquid. The invention further relates to a mobile decontamination module capable of delivering foam or liquid decontaminant that is useful in decontaminating wide areas (e.g., airfields, seaports, and terrain) and individual equipment (e.g., aircraft and buildings).

BACKGROUND OF THE INVENTION

The availability of chemical and biological agents to individuals and rogue nations coupled with the recent terrorist attacks in the United States have resulted in the development of foam-based or liquid-based decontaminants that can be dispersed over a wide area (i.e., strategic decontamination of an airfield or seaport) or on individual equipment (i.e., tactical decontamination of aircraft or tactical vehicles). One such foam-based decontaminant is formed from binary or trinary decontamination fluids. Specifically, Sandia National Laboratories has developed a foam-based decontaminants (referred to as "Decon Foam 100" and "Decon Foam 200") for use in connection with a variety of delivery apparatus discussed herein. Decontaminant foams are preferred over decontaminant liquids because of the storage efficiencies, environmental concerns, safety considerations, sustained dispersal rates, and ground coverage offered by foam-based decontaminants. Preferred foam-based decontaminants under current development and testing are created by mixing binary or multi-component decontaminant fluids. Delivery means for the preferred binary or multi-component decontaminant fluids, however, are limited.

Existing liquid decontaminants are typically based on bleach, chlorinated solvents, or other hazardous or corrosive materials. The characteristics of existing liquid decontaminants degrade the structural integrity of the delivery apparatus (e.g., corrosion of storage tanks 11), damage equipment treated with the decontaminant (e.g., aircraft surfaces), and harm the environment (e.g., kill vegetation). Unfortunately, the majority of available decontaminants are designed to render a limited number of chemical or biological agents inactive. Moreover, existing decontaminants are relatively expensive.

The advantages provided by the current foam-based decontaminants are numerous. For example, foam-based decontaminants are environmentally friendly and may be immediately dispersed in public areas with minimal concern for harmful effects to human, plant, or animal life. Further, upon dispersal, foam-based decontaminants are readily visible to the naked eye. Thus, individuals and decontamination teams are able to readily identify areas that have been treated with the decontaminant. Moreover, foam-based decontaminants increase contact time with the hazardous agent. Specifically, foam does not immediately move to the lowest point of an affected area and remains adjacent affected structures for a longer period of time as compared to liquid decontaminants. Further, the decontaminant foam may expand up to about 100 times-and more typically eight to twenty times-its liquid volume when disbursed through an aerated nozzle. Once dispersed, the foam eventually returns (i.e., collapses) to its original liquid state. Subsequently, decontamination teams are able to wash the residue liquids down storm drains or the like. Moreover, preferred foam decontaminants act to degrade a wide variety of chemical and biological decontaminants.

The foam is a combination of readily available chemical compounds that neutralize chemical agents in much the same way a detergent cleans a garment. Specifically, the surfactants and mild oxidizing agents chemically break down the phosphate or sulfide bonds holding the molecules of the chemical agent together, resulting in non-toxic agents. For example, decontamination teams used a form of the foam made available by Sandia Labs to decontaminate certain federal buildings in Washington, D.C., after the recent anthrax attacks.

Figure 1:
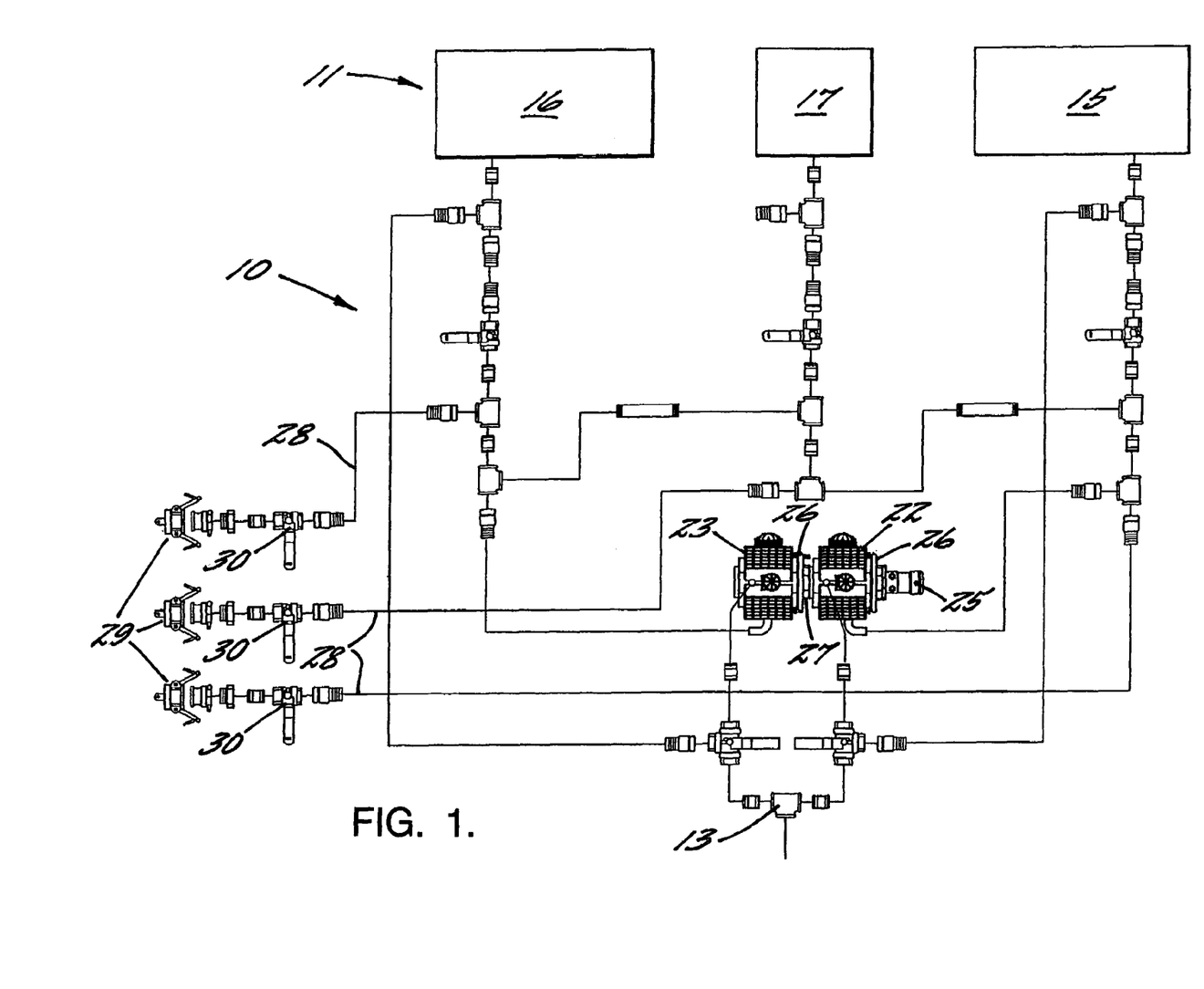
FIG. 1 is a schematic view of a first embodiment of the apparatus for mixing and dispensing a foam-based or liquid-based decontaminant.
Figure 2:
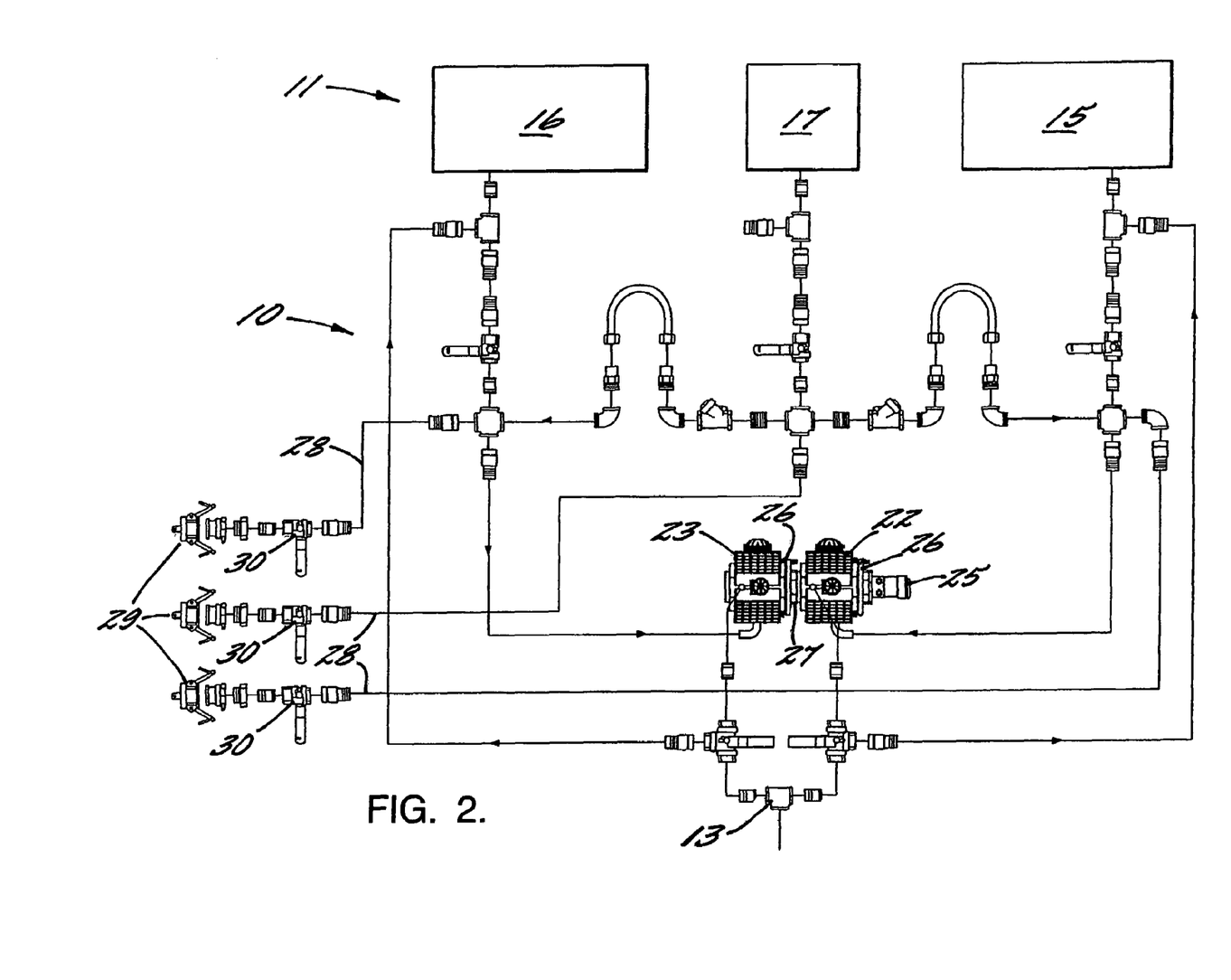
FIG. 2 is a flow diagram of the first embodiment of the apparatus for mixing and dispensing a foam-based or liquid-based decontaminant.
Figure 3:
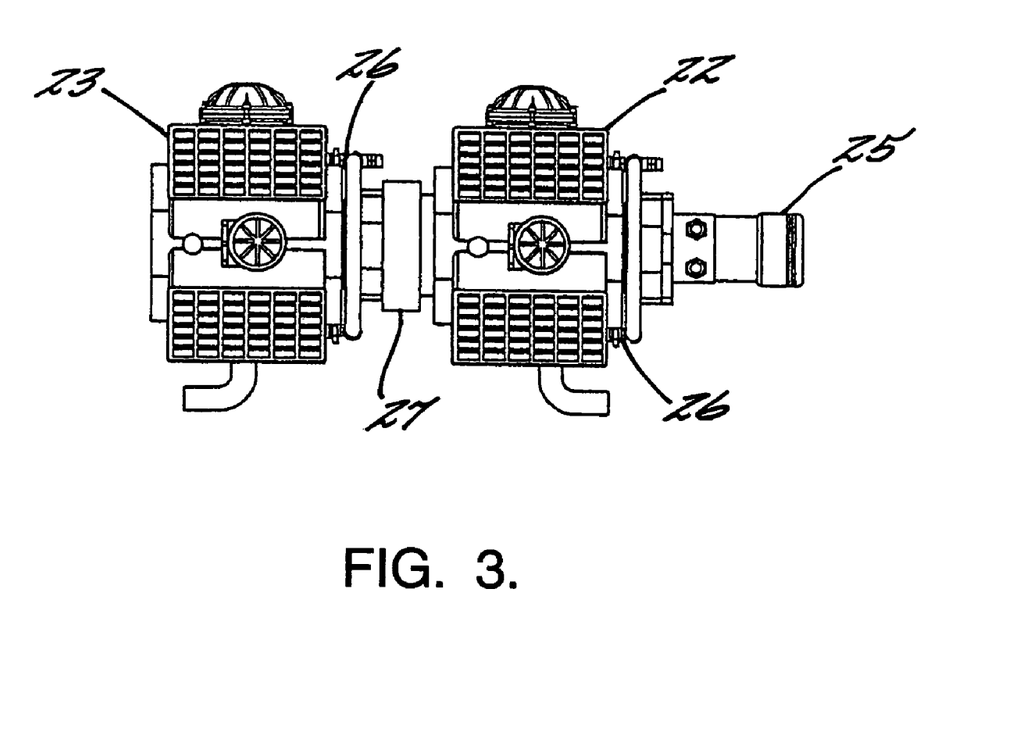
FIG. 3 is a schematic view of the first embodiment of the pump assembly.

A known option for delivering decontaminants is a portable self-contained compressed air foam (commonly referred to as "CAF") system resembling a backpack that is sold by Intelagard under the trademark MACAW™ (see FIG. 1). The MACAW™ backpack is capable of expanding 5 gallons of a particular decontamination solution into 250 gallons of finished foam and is capable of propelling the foam to a distance of up to 35 feet. Nevertheless, these small man-portable units lack the capacity for carrying sufficient amounts of decontaminant for dispersal over wide areas. Further, the commercially available man-portable units are incapable of dispensing the preferred binary or multi-component decontaminant fluids.

Another available option for delivering decontaminants is a self-contained handcart CAF system sold by Intelagard under the trademark MERLIN™. The MERLIN™ handcart includes a 15-gallon tank that is capable of expanding its payload up to 70 times and projecting finished foam up to 45 feet. Unfortunately, the handcart equipment is likewise incapable of dispensing the preferred binary or multi-component decontaminant fluids.

Yet another known option is a foam delivery vehicle (FDV) sold under the trademark EASYCAFS™. The FDV is a compressed air foam system mounted on the back of an all-terrain vehicle. This system is capable of dispensing 75 gallons of a particular decontamination solution.

The known devices, however, are ill suited for mixing and delivering the preferred binary or multi-component decontaminant foams. Specifically, these known CAF systems are limited to decontaminant foam created by introducing compressed air into the fluid stream in conjunction with an aerated nozzle to create the desired foaming action. Accordingly, there is a need for an apparatus that is capable of mixing preferred binary or multi-component decontaminant fluids and dispensing foam decontaminants. Specifically there is a need for a pump assembly that safely and effectively mixes the liquid binary or multi-component agents to form foam or liquid decontaminants.

Unfortunately, the known devices referenced above have limited storage and dispensing capacity. Accordingly, a mobile decontamination module capable of storing several hundred gallons of decontamination fluid and capable of dispersing the decontaminant for a minimum sustained time at maximum output for at least 30 to 60 minutes is desirable.

Chemical and biological agents pose a threat to U.S. military forces stationed abroad in combat operations, as well as units deployed domestically in reaction to a chemical or biological attack. Accordingly, there is a need for mobile decontamination equipment that can be readily deployed to a crisis area either overseas in a combat environment or in a major U.S. city. Accordingly, there is a need for a mobile decontamination module that is air transportable to affected areas in an effort to quickly sustain and reconstitute military operations worldwide.

As a result of the development of binary or multi-component decontamination fluids, there also exists a need for a mobile decontamination module that is capable of mixing and dispersing binary or multi-component decontaminant fluids as a foam-based or liquid-based decontaminant.

A further need exists for a mobile decontamination unit that is capable of effectively delivering decontaminant to wide areas such as airfields, seaports, and terrain.

There is also a need for a mobile decontamination module that is capable of delivering the decontaminant to a vertical height sufficient to cover top surfaces of aircraft and other military equipment, and the sides and rooftops of man-made structures.

A need also exists for a mobile decontamination module having a quick drain and refill capability. Specifically, an onboard suction fill apparatus for resupplying the mobile module with binary or multi-component decontaminant fluids and water is desirable.

There is a further need for a mobile decontamination module that requires a minimal amount of training time to effectively operate the module.

There also exists a need for a mobile decontamination module that is capable of operating at a variety of temperatures ranging approximately from approximately −20 degrees Fahrenheit to 120 degrees Fahrenheit.

The mobile decontamination module must also be capable of withstanding the rigors of airlift and off-road deployment, yet remain readily accessible to the end user. Accordingly there is a need for a mobile decontamination module that provides easy access to the dispersal hoses and nozzles, yet prevents premature structural failure.

A further need exists for a mobile decontamination module that is compatible with the on-load and off-load equipment aboard heavy transport vehicles in the U.S. military inventory (e.g., Heavy Expanded Mobility Tactical Truck or HEMTT).

Moreover, most decontamination equipment lacks the ability to clean or "wash down" a vehicle or structure that has been treated with decontaminant. Stated differently, upon dispersal of the decontaminant, a second piece of equipment is typically required to wash the foam from the affected area. Thus, there is a need for a mobile decontamination module that not only disperses decontaminants, yet is capable of dispensing water to clean the foam from the affected area.

A further need exists for storage of multiple fluids separately for 5 to 10 years. When mixed shelf life is 8 hours. Most existing equipment uses a pre-mix due to lack of a proper pumping system.

Yet a further need exists for an apparatus that incorporates a self-cleaning or self-flushing capability. Specifically, a need exists for an apparatus that is capable of flushing the conduits that deliver the binary or multi-component decontaminant fluids with water.

When deployed with military forces, it is desirable to have a mobile decontamination module that is capable of operating at a variety of temperatures. Thus, there is a need for a mobile decontamination module that is capable of preventing the freezing of the decontaminants. Likewise, when deployed in a combat situation, there is a need for a mobile decontamination module that is easily maintained and capable of ready repair.

SUMMARY OF THE INVENTION

It is therefore an object of the present invention to provide an apparatus that is capable of mixing preferred binary or multi-component decontaminant fluids and dispensing foam or liquid decontaminants.

Yet another object of the invention is the provision of an apparatus that safely and effectively mixes the binary or multi-component decontaminant fluids to form foam or liquid decontaminants.

A further object of the invention is to provide an apparatus and mobile decontamination module capable of storing several hundred gallons of binary or multi-component decontaminant fluid and capable of dispersing the decontaminant foam or liquid for a minimum sustained time at maximum output for at least 30 to 60 minutes.

Another object of the invention is the provision of a mobile decontamination module that can be readily deployed to a crisis area, and specifically a mobile decontamination module that is air transportable.

Another object of the invention is to provide a mobile decontamination module that is capable of decontaminating a wide area such as terrain or airfields.

Yet another object of the invention is to provide a mobile decontamination module that is capable of delivering decontaminants to a vertical height sufficient to cover top surfaces of aircraft and other military equipment, and the sides and rooftops of man-made structures.

Still another object of the invention is the provision of a mobile decontamination module having a quick drain and refill capability.

Another object of the invention is the provision of a mobile decontamination module that requires a minimal amount of training time to effectively operate the module.

Yet another object of the invention is to provide a mobile decontamination module that is capable of operating at a variety of temperatures.

Still another object of the invention is to provide a mobile decontamination module that is capable of withstanding the rigors of airlift and off-road deployment.

A further object of the invention is the provision of a mobile decontamination module that is compatible with the on-load and off-load equipment aboard heavy transport vehicles in the U.S. military inventory.

Another object of the invention is to provide a mobile decontamination module that not only disperses decontaminants, but also is capable of dispensing water to clean the foam from the affected area.

Yet another object of the invention the provision of a mobile decontamination module having a self-cleaning capability whereby water is flushed through conduits that deliver the binary or multi-component decontaminant fluids to prevent clogging.

Still another objective of the invention is to provide a mobile decontamination module that is easily maintained and capable of ready repair.

The invention meets these objectives with an apparatus and mobile decontamination module for mixing binary or multi-component decontaminants and dispensing decontaminant foam that is useful in decontaminating areas affected by chemical and biological agents. In particular, the invention is an apparatus having a plurality of tanks 11 for containing decontamination fluid, a pump assembly for advancing the liquid, and a manifold for mixing and dispensing the foam-based or liquid-based decontaminant. The invention also meets these objectives with a mobile decontamination module having a plurality of tanks 11, a pump assembly, a manifold, and a boom for dispensing the decontaminant foam or liquid, wherein the unit is mounted on a wheeled chassis. Still further, the invention meets these objectives with a decontamination module having a plurality of tanks 11, a pump assembly, a manifold, and a boom for dispensing the decontaminant foam, wherein the unit is capable of being mounted on a heavy transport vehicle.

The foregoing and other objects and advantages of the invention and the manner in which the same are accomplished will become clearer based on the following detailed description taken in conjunction with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 4:
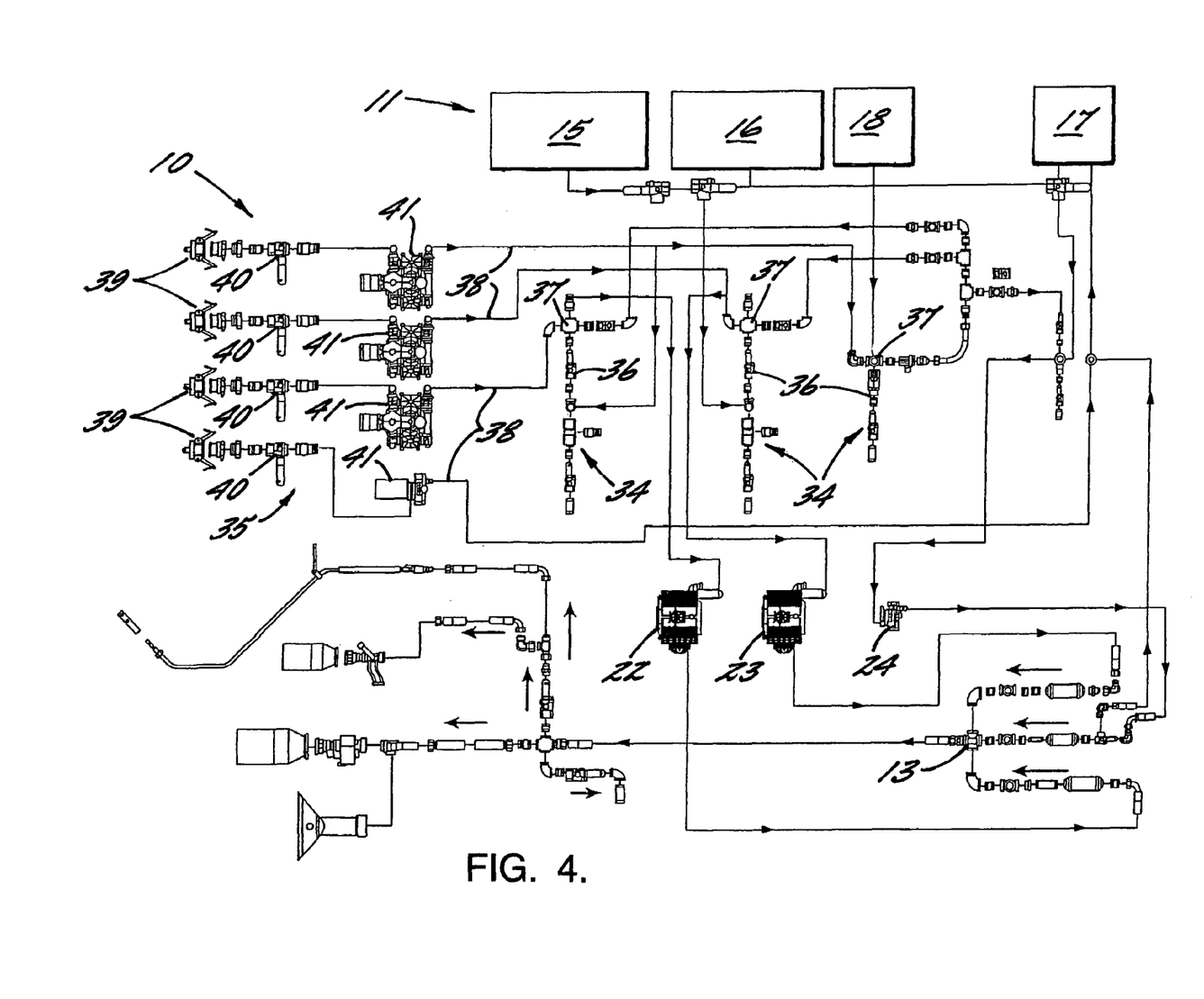
FIG. 4 is a flow diagram of a second embodiment of the apparatus for mixing and dispensing a foam-based or liquid-based decontaminant.

An overall view of the apparatus 10 for mixing liquid decontaminants and dispensing decontaminant foam that incorporates features of the present invention is set forth in FIGS. 1 and 4. A preferred embodiment of the apparatus includes a plurality of tanks 11, a pump assembly 12, a manifold 13, and a unitary drain and fill assembly 14.

The plurality of tanks 11 is capable of containing liquids. In a preferred embodiment, a first tank 15 contains one liquid part or agent of a binary or multi-component decontamination fluid, a second tank 16 contains a second liquid part or agent of decontamination fluid, a third tank 17 contains a third liquid part or agent of decontamination fluid, and a fourth tank 18 includes water for mixing or flushing. When mixed, the liquids from the first, second, and third tanks 15,16,17 form a decontaminant fluid that is capable of being dispersed as decontaminant foam or liquid over an area or piece of equipment affected by chemical or biological agents. In a preferred embodiment the minimum spray time at maximum output ranges from 30 to 60 minutes. Recent trials indicate that approximately 55 to 60 vehicles can be decontaminated before having to resupply the tanks 11. When used in wide-area decontamination, ground coverage for the foam-based decontaminant dispersed by the invention was 12,850 square meters ($m^2$) or 3.17 acres. Water from the third tank 17 is available for rinsing the residue of the binary decontamination fluid from the affected area or affected equipment. The water is also provided to flush the pump assembly 12 and associated conduits to prevent clogging.

In preferred configurations, the tanks 11 may include two 900-gallon tanks 11 and one 50-gallon tank for retaining the binary or multi-component decontamination fluids and one 125-gallon tank for retaining water. In an alternative embodiment discussed below (i.e., apparatus mounted on a wheeled platform), the tanks 11 may include two 800-gallon tanks and one 50-gallon tank for retaining the binary or multi-component decontamination fluids, and one 100-gallon tank for retaining water. The tanks 11 are preferably made of stainless steel. It will be understood, however, that an alternative embodiment may include a plurality of tanks 11 for mixing a multi-component decontaminant fluid.

Referring to FIGS. 1 and 4, the pump assembly 12 is in fluid communication with the plurality of tanks 11. In a preferred embodiment, the pump assembly includes a first pump 22, a second pump 23, and a third pump 24, and one or more motors 25 for driving the pumps. The first pump 22 includes a drive assembly 26 for operating the pump. The first pump 22 is in communication with at least one of the plurality of tanks 11, and preferably a tank containing one part of the decontamination fluid.

The second pump 23 also includes a drive assembly 26. The second pump 23 is in communication with at least one of the tanks, and preferably a tank containing a second part of the decontamination fluid.

The third pump 24 likewise includes a drive assembly 26. The third pump 24 is in communication with at least one of the tanks, and preferably a tank containing a third part of the decontamination fluid. Each pump may include a motor 25 for driving the respective drive assemblies 26 independent of the other pumps.

It will be understood, however, that the pump assembly 12 may include a plurality of pumps capable of mixing a multi-component decontaminant fluid from a plurality of tanks. Further it will be understood that each pump may include a drive assembly 26. In this alternative embodiment a plurality of couplings or connectors 27 connect the plurality of pumps. In this configuration, one motor 25 is required to drive the drive assemblies 26 of the pumps (See FIG. 5).

The couplings 27 connect the drive assemblies of the respective pumps. Specifically, one coupling 27 connects the drive assembly 26 of the first pump 22 to the drive assembly 26 of the second pump 23, and another coupling 27 connects the drive assembly 26 of the second pump 23 to the drive assembly of the third pump 24. The motor 25 is connected to the drive assembly 26 of the first pump 22 (see FIG. 5).

Figure 5:
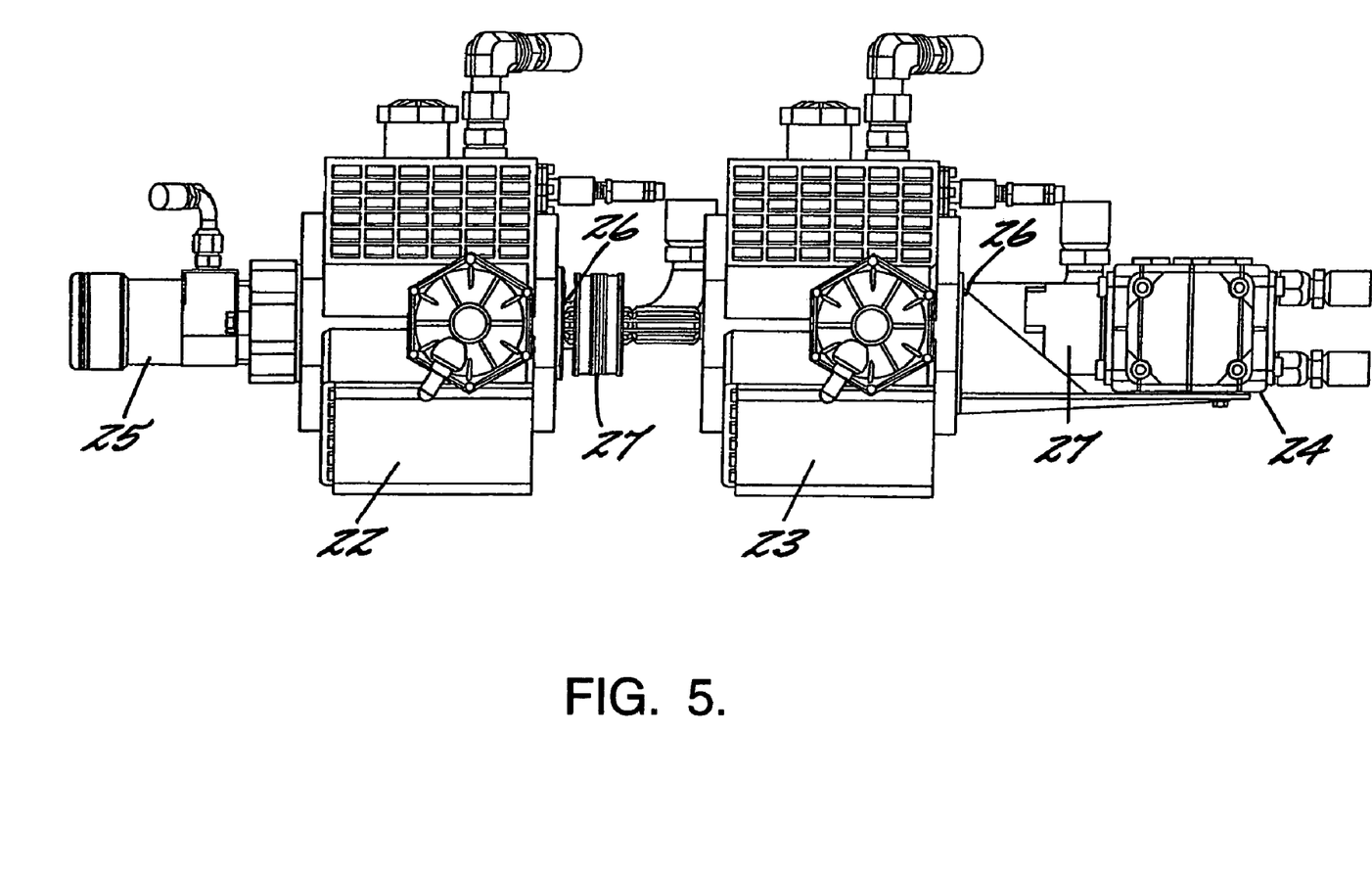
FIG. 5 is a schematic view of the second embodiment of the pump assembly.

Accordingly, the motor 25 is capable of engaging the drive assembly 26 of the first pump 22 such that the motor engages the drive assembly of the first pump to thereby drive the drive assembly of the second pump 23 and the drive assembly of the third pump 24. In a two-pump configuration, the first and second pumps 22,23 are capable of drawing a preferred mixture of the two liquids forming the decontaminant. Thus, the pump assembly 12 is capable of mixing approximately the same amount of binary decontamination fluids at a defined ratio (e.g., 1:1).

In an alternative embodiment (e.g., a three pump configuration) discussed above, a plurality of couplings 27 (e.g., two couplings) connects the drive assemblies 26 of the plurality of pumps. Thus, each pump is capable of drawing a preferred mixture of liquids forming a multi-component decontaminant. Thus, the pump assembly 12 is capable of mixing approximately the same amount of multi-component decontamination fluids at a defined ratio (e.g., 1:1:1).

Accordingly, a preferred embodiment is capable of creating approximately the same amount of flow of liquids from the first tank 15 and the second tank 16 through the first and second pumps 22,23 to the manifold 13 for mixing (See FIG. 1). It will be understood, however, that alternative embodiments of the pump assembly 12 (i.e., including three pumps) are capable of mixing the multi-component decontamination fluids at any number of desired ratios (i.e., 1:2:1, 1:3:1, 2:1:1, etc.) depending upon the desired mixture. In a preferred embodiment, the first, second, and third pumps 22,23,24 are positive displacement diaphragm pumps having relief valves to protect the pumps and conduit. Alternatively, it is within the scope of the invention to employ a pump assembly 12 configured to draw liquids from any number of tanks in various defined ratios.

Advantageously, this configuration incorporating the positive displacement diaphragm pumps permits the even mixing of binary or multi-component decontamination fluids (e.g., 50%/50% or 33%/33%/33%). Known devices incorporate centrifugal pumps that are unsuitable for creating equal amounts of flow of the preferred binary or multi-component decontaminant fluid. Specifically, the preferred binary or multi-component liquids vary in weight (i.e., one is more dense than the others). Accordingly in centrifugal pumps, the less dense liquid will flow through the pump more readily and create a greater fluid flow than the more dense fluid. This affect results in an unevenly mixed resulting binary or multi-component decontaminant fluid. An uneven mix of the separate fluids degrades the effectiveness of the resulting binary or multi-component decontaminant fluid. As configured, the motor 25 and coupling 27 of the present invention drives the drive assemblies 26 of the first, second, and third pumps 22,23,24 in a near simultaneous fashion, resulting in a preferred mixture of the liquids forming the decontaminant.

Advantageously, the invention may incorporate a plurality of tanks and a plurality of pumps wherein the pump assembly mixes the multi-component decontamination fluids at varying ratios (See FIG. 4).

The manifold 13 is in communication with the first pump 22, second pump 23, optional third pump 24 and the tanks 11. In a preferred embodiment, the manifold 13 is a three-way ball valve having multiple T-joints. The manifold 13 provides for the mixing of the fluids forming the binary or multi-component decontaminant foam or liquid. As configured, the manifold 13 is also capable of dispensing liquid from the plurality of tanks 11 individually.

In other words, the manifold 13 can dispense liquid independent of the first pump 22, second pump 23, or third pump 24. Further, the manifold 13 is configured to permit the flushing of the manifold with water from one of the plurality of tanks 11. Flushing with water is oftentimes necessary to prevent clogging.

In one embodiment, the drain and fill assembly 14 is a unitary assembly that includes a plurality of conduits 28, a plurality of couplings 29, and a plurality of valves 30 (See FIG. 1). Stated differently, the unitary drain and fill assembly 14 drains and fills the plurality of tanks 11 at each of the respective couplings 29 (i.e., at one position). The drain and fill assembly 14 permits the rapid draining and filling of the tanks 11. Preferably, the drain and fill assembly 14 permits the operator to drain the tanks 11 via gravity action and to fill the tanks via a suction fill method. Recent trials conducted with the invention indicate that the resupply time-including set-up time-is approximately 40 minutes when using the onboard suction fill method. Each coupling 29 is capable of receiving a hose to assist in the drain and fill operation. The valves 30 are provided to open and close the conduit 28 leading to each tank. In a preferred embodiment, each conduit 28 has a dedicated coupling 29 and valve 30.

In an alternative embodiment, the invention includes a separate drain assembly 34 and a separate fill assembly 35 (See FIG. 4). Specifically, the drain assembly 34 includes a plurality of conduits 36 in communication with the plurality of tanks 11, and a plurality of valves 37 in communication with the plurality of conduits. In this embodiment, the pump assembly 12 operates to drain the plurality of tanks 11 by pumping liquids from the tanks to outlets positioned along the conduits 36.

The fill assembly 35 includes a plurality of conduits 38 in communication with the plurality of tanks 11, a plurality of couplings 39 in communication with the plurality of conduits, a plurality of valves 40 in communication with the plurality of conduits, and a plurality of pumps 41 in communication with the couplings, the conduits, and the tanks. Each coupling 39 is capable of receiving a hose. In this embodiment, the pumps 41 of the fill assembly 35 operate to fill the plurality of tanks 11 as opposed to the pump assembly 12 of the apparatus. Advantageously, this configuration provides for dedicated filling operations and dedicated dispensing operations, thereby alleviating the mechanical burden on the pump assembly 12. The pumps 41 of the fill assembly 35 operate by pumping liquids from the couplings 39 through the conduits 38 and to the tanks 11. Specifically, hoses are connected to the couplings 39 of the fill assembly 35 such that liquids can be drawn from any number of storage tanks, containers, or mobile totes (i.e., bladders). Further, water can be drawn from any number of tanks, containers, fire hydrants, or natural bodies of water.

In this particular embodiment, the drain assembly 34 and the fill assembly 35 drain and fill the tanks 11, respectively, at separate positions along the respective conduits 36,38 (See FIG. 4). Further, the pump assembly 12 and the fill assembly 35 are capable of flushing liquid (e.g., water) from one of the tanks through the pump assembly, the fill assembly, the conduits 36,38, and the manifold 13 during cleaning and maintenance operations.

Figure 6:
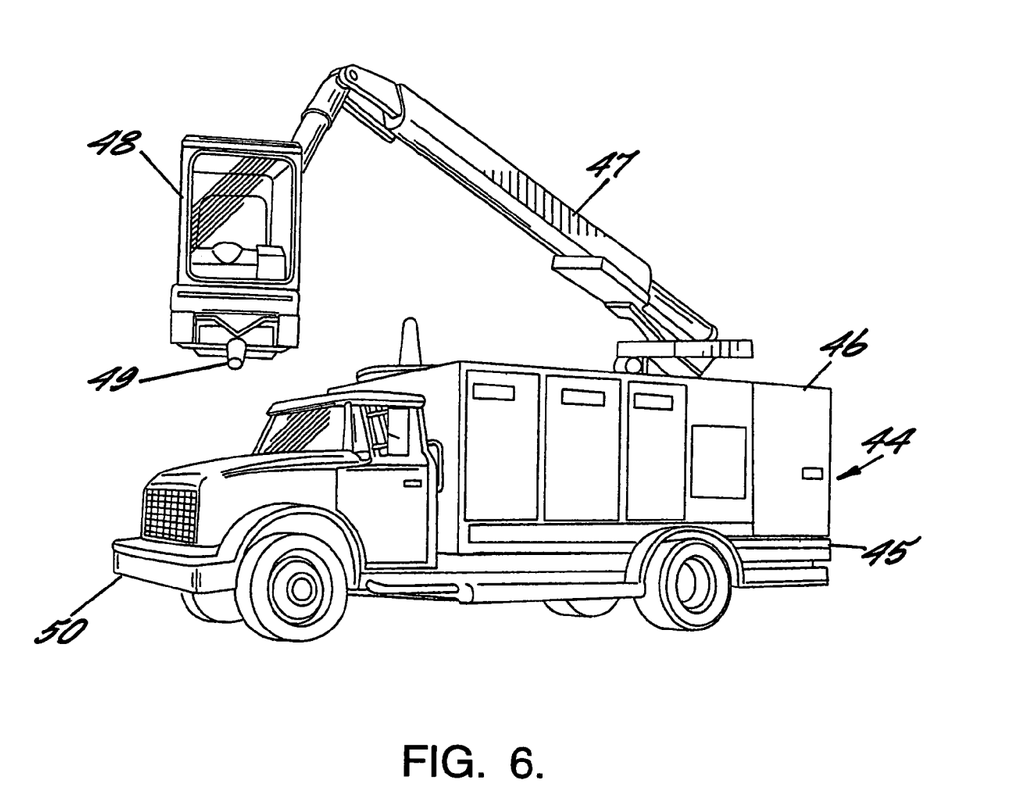
FIG. 6 is a perspective view of a first embodiment of the mobile decontamination module as incorporated into a vehicle.
Figure 7:
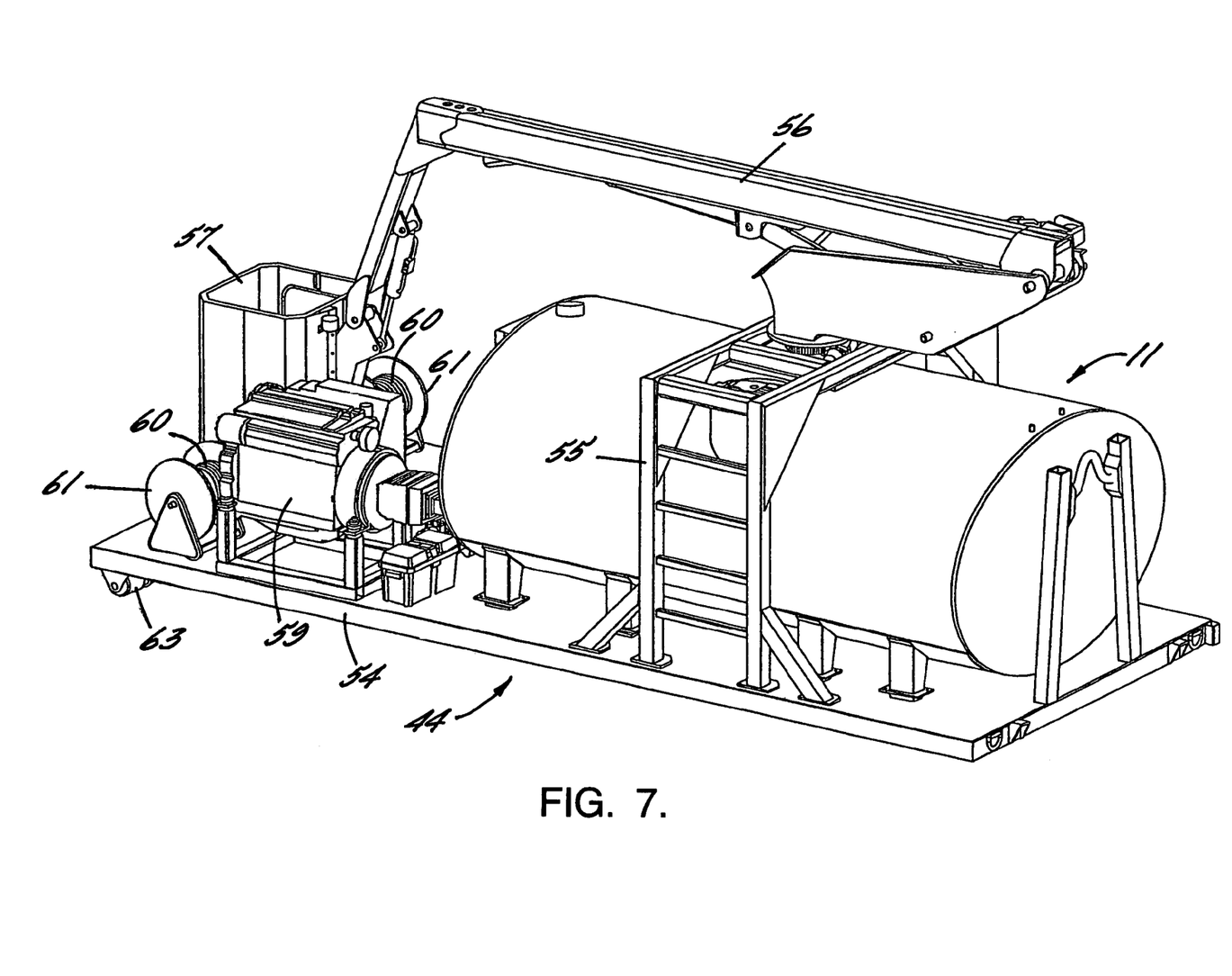
FIG. 7 is a perspective view of a second embodiment of the mobile decontamination module secured to a mobile platform.
Figure 8:
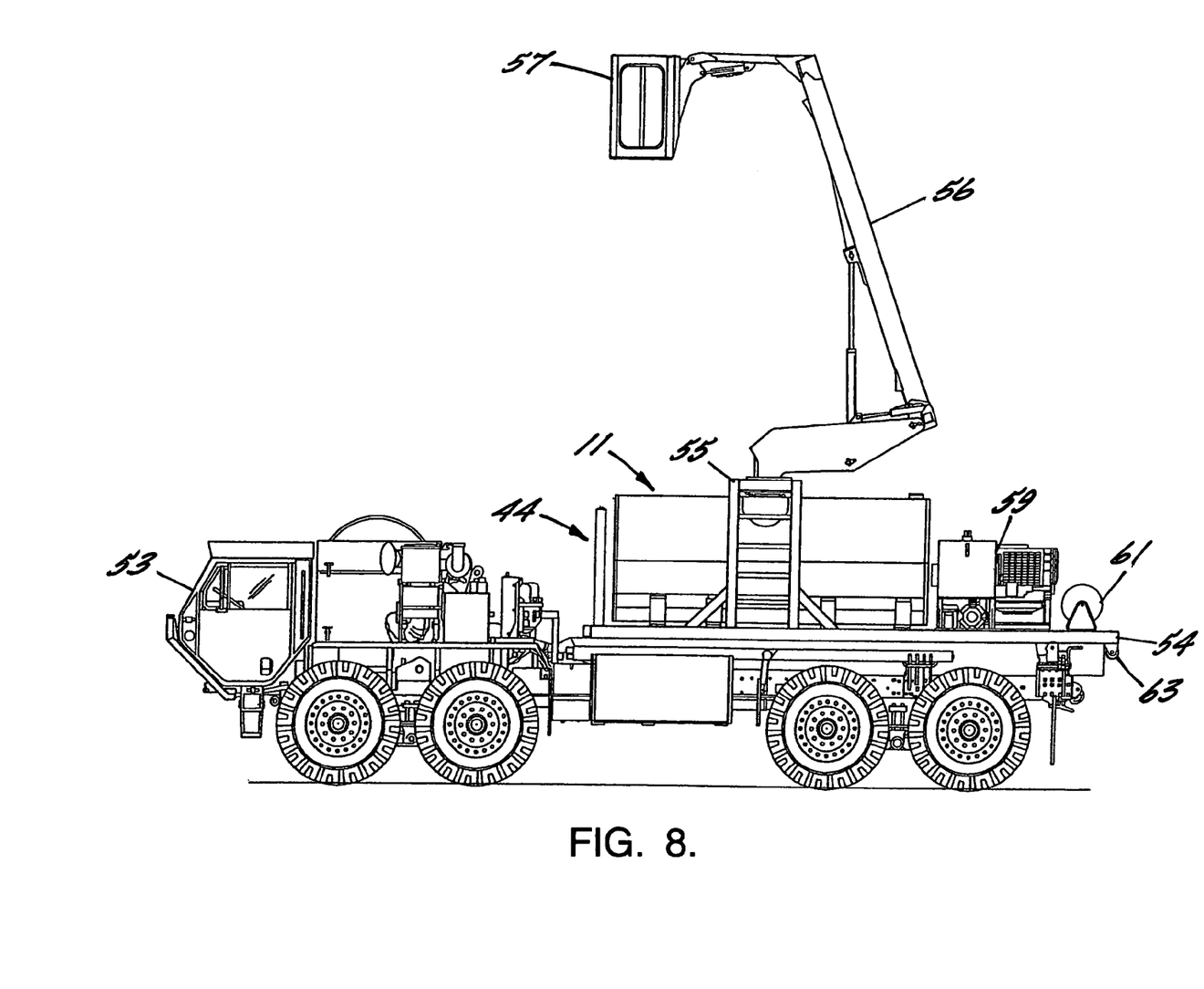
FIG. 8 is a perspective view of the second embodiment of the mobile decontamination module as incorporated into a heavy transport vehicle.

In another embodiment, the invention provides for mobile decontamination module for mixing liquid decontaminants and dispensing liquid-based or foam-based decontaminants. Specifically, as depicted in FIGS. 6, 7, and 8, the apparatus described above can be incorporated into a mobile decontamination module 44 (e.g., a wheeled vehicle 50 or heavy transport vehicle 53). The mobile decontamination module 44 includes the plurality of tanks 11, pump assembly 12, manifold 13, and the unitary drain and fill assembly 14 (or the separate drain assembly 34 and separate fill assembly 35) as described above (see FIGS. 1 and 4), and further includes a platform 45 having wheels or rollers 63 and an enclosure 46. As secured to a vehicle 50, the module 44 is commonly referred to as a GL1800DAP decontamination system. In a preferred embodiment, the module 44 is mounted on an International 4700 or Freightliner M2 chassis having a diesel engine and an automatic transmission. Specifically, the mobile decontamination module 44 includes the platform 45 for supporting the tanks, the pump assembly 12, the unitary drain and fill assembly 14 or separate drain assembly and separate fill assembly, the manifold, and the enclosure.

A pump for dispensing water is provided. The pump associated with the tank containing water (e.g., tank three) is capable of delivering water to the dispensing nozzle without having the water travel through the pump assembly described above.

The enclosure 46 is arranged to surround at least a portion of the plurality of tanks 11, and preferably encloses the tanks.

The mobile decontamination module 44 also includes a retractable boom 47, an enclosed cab 48, and a dispensing nozzle 49 (see FIG. 6). Alternatively, the module 44 may include an open basket in place of the enclosed cab. The boom 47 is rotatably mounted at one end to a top portion of the enclosure 46. The boom 47 is in communication with the plurality of tanks 11, the pump assembly 12, and the manifold 13.

In a preferred embodiment, the boom 47 provides a nozzle height of 42 feet and is capable of dispensing decontaminant on the top surfaces of most military equipment (e.g., trucks) and smaller aircraft (e.g., fighter aircraft). It will be understood, however, that an alternative embodiment of the invention includes a boom 47 that provides a nozzle height of 75 feet. The alternative embodiment of the boom 47 is capable of dispensing decontaminant on the top surfaces of the larger transport aircraft such as the C-5 Galaxy and C-17 Globemaster III.

Optionally, the enclosed cab 48 may be pressurized, (i.e., positive air pressure in the enclosed cab) to eliminate the requirement for personnel to wear Mission-Oriented Protective Posture (MOPP) gear. Advantageously, a pressurized cabin would mean that personnel operating the boom from within the cab without MOPP gear would have a greater freedom of movement and a better field of vision.

The enclosed cab 48 is secured to another end of the boom 47 and is capable of supporting a boom operator. It will be understood that the enclosed cab 48 is rotatable about a pivot point on the boom 47. In a preferred embodiment, the cab 48 is capable of sustaining a load of 350 pounds.

The dispensing nozzle 49 is connected to the boom 47 and is in communication with the plurality of tanks 11, the pump assembly 12, and the manifold 13. Accordingly, a boom operator can manipulate the boom 47 from within the cab 48 to disperse decontaminant to a desired area. In a preferred embodiment, the dispensing nozzle 49 is an aerated nozzle for facilitating the dispensing of foam or liquid decontaminant. Preferably, the nozzle 49 is capable of reaching a vertical height of 42 feet and capable of extending to a horizontal distance of 33 feet. Recent trials indicate that the boom 47 is capable of dispensing foam-based or liquid-based decontaminant to a height ranging from 43 to 52 feet.

An alternative embodiment of the present invention includes a nozzle assembly and remote camera secured to the distal end of the boom. As configured, an operator in the chassis cab could remotely operate the boom and nozzle assembly to decontaminate desired areas and equipment.

A preferred embodiment of the dispensing nozzle 49 as used for wide area decontamination is fan-shaped. The fan-shaped nozzle dispenses decontaminant in a wide area dispersion pattern. Alternatively, the nozzle 49 may include two outlets, wherein a first outlet dispenses the decontaminant and a second outlet dispenses a stream of air. In this alternative embodiment, the first outlet is positioned above the second outlet, such that decontaminant exits the first outlet and flows into the air stream. In other words, gravitational forces act on the decontaminant fluid and the fluid drops into the air stream. Accordingly, the air stream accelerates the dispersal of the decontaminant over wide areas.

In this alternative embodiment wherein the nozzle 49 include two outlets, a device for metering the air pressure delivered to the second outlet is provided. In this fashion, an operator can ensure that sufficient decontaminant is delivered to the desired area. For example, the invention can deliver up to 60 gallons of decontaminant per minute.

In yet another embodiment, the nozzle 49 may include a single outlet, whereby fluid is introduced into the air stream at a desired location between the pumps and the nozzle. For example, fluid may be introduced into the conduit delivering the air stream to the nozzle 49. The invention can deliver up to 40 gallons of decontaminant per minute into the air stream.

The mobile decontamination module may also include a heating system for heating the binary or multi-component decontaminant liquids to prevent freezing in cold weather climates. The heating system may include heating elements placed adjacent any number of elements of the module 44 to heat the liquid at various stages during operation. Trials indicate that the apparatus 10 and module 44 are capable of operating in temperature ranging from −20 degrees Fahrenheit to 110 degrees Fahrenheit.

As mounted on a wheeled-chassis, the mobile decontamination module 44 may also include a 50 foot ground reel and nozzle on a front bumper of the chassis. A 50-foot ground reel may also be secured to the rear of the chassis.

In yet another embodiment, the invention provides for a mobile decontamination module 44 that is capable of being loaded onto a heavy transport vehicle 53, such as a HEMTT. As depicted in FIG. 8, the mobile decontamination module 44 can be readily loaded onto a HEMTT. In a preferred embodiment, the mobile decontamination module 44 is configured such that the self-loading apparatus of the HEMTT is capable of loading and unloading the mobile decontamination module.

The mobile decontamination module includes the plurality of tanks 11, pump assembly 12, manifold 13, unitary drain and fill assembly 14, or separate drain assembly 34 and separate fill assembly 35, as described above. In an alternative embodiment of the drain and fill assembly 14, the module may include a top fill and suction fill capability for refilling the tanks.

Advantageously, the alternative embodiment of the mobile decontamination module 44 includes a wheeled platform 54 for supporting the tanks 11, pump assembly 12, manifold 13, and drain and fill assemblies 14,34,35 (see FIG. 7). The wheeled platform 54 permits the easy loading and off-loading of the module 44 from the heavy transport vehicle 53 (e.g., HEMTT). Further, the compact size of the module 44 permits the module to be transportable on a variety of aircraft in the U.S. Air Force inventory to include C-130 Hercules, C-141 Starlifter, C-5 Galaxy, and C-17 Globemaster III.

A frame 55 that is secured to the platform 54 is provided to support a retractable boom 56. The boom 56 is rotatably mounted at one end to the frame 55. As mounted, the boom 56 provides 360-degree rotation.

The mobile decontamination module 44 also includes a basket that is secured to another end of the boom 56 (i.e., the end not connected to the frame). The basket 57 is capable of supporting an operator (i.e., up to approximately 300 to 350 pounds). A dispensing nozzle 58 is connected to the boom 56. Preferably the dispensing nozzle 58 is secured to the basket 57. The dispensing nozzle 58 is in communication with the plurality of tanks 11, the pump assembly 12, and the manifold 13. Advantageously, the boom dispensing nozzle 58 is controllable from the basket 57 and a control panel on the platform 54 (discussed herein).

A boom pump for operating the boom 56 is provided. The boom pump is preferably driven by hydraulics.

This preferred embodiment of the mobile decontamination module 44 provides an intercommunication system for facilitating communications between operators of the mobile decontamination module. For example, headsets may be provided such that an operator in the basket 57 is able to communicate with the driver of the heavy equipment vehicle 53 or with an operator using one of the hose and reel assemblies 60,61 (discussed herein).

A hydraulic pump is mounted on the platform for operating onboard hydraulics.

The invention further provides an engine 59 mounted on the platform 54 for supplying electricity to various systems, a fuel cell mounted on the platform for the various pumps and engine, and an auxiliary pump mounted on the platform. The auxiliary pump is preferably electric and may be used to operate a variety of equipment.

A control panel is provided for remotely controlling the boom 56 and operating the engine 59. The control panel is mounted on the platform 54 adjacent the engine 59.

A plurality of conduits is provided for delivering liquids between the tanks, the pump assembly, and the manifold. A plurality of fittings for connecting the conduits is also provided. The invention includes a plurality of valves associated with the conduits for directing liquids between the tanks, the pump assembly, and the manifold.

The mobile decontamination module 44 also includes a plurality of dispensing hoses 60 in communication with the manifold. A preferred embodiment includes two dispensing hoses 60 (see FIG. 7). The dispensing hoses 60 are capable of dispensing liquid-based or foam-based decontaminant onto a desired area. The dispensing hoses 60 are operated independent of the boom dispensing nozzle 58. Stated differently, the manifold 13 is capable of delivering liquids or foam to the boom dispensing nozzle 58 and the dispensing hoses 60. Thus, in a preferred operation, up to three operators can dispense decontaminant. Specifically, one operator can dispense decontaminant from the boom 56, and two operators can dispense decontaminant from the two hoses 60 having a spray nozzle or an undercarriage hand wand. In a preferred embodiment the invention includes a hand wand and a spray gun attached to the two dispensing hoses (see FIG. 4). Thus, a minimum of 1 operator and an optimum of 2 operators are typically used to conduct wide-area decontamination. A minimum of 2 operators and an optimum of 3 operators are typically used to conduct fixed-site decontamination. A minimum of 2 operators and an optimum of 4 operators are typically used to conduct vehicle decontamination.

A plurality of reel assemblies 61 secured to the platform 54 is provided for collecting and storing the dispensing hoses 60. The reel assemblies 61 are mounted to the platform 54 (see FIG. 7).

Advantageously, operators require approximately 2 hours of training time to understand and operate the module 44. Operators require approximately 8 hours of training to become proficient. Regarding maintainability, major components of the module 44 can be replaced within 6 hours and repair requires no special tools. Further, maintenance training time for operators is approximately 16 hours.

The tanks 11, pump assembly 12, manifold 13, couplings 27,39, conduits 28,36,38, and remaining elements of the above invention are optimized to dispense the binary or multi-component decontaminant fluid developed by Sandia National Laboratories.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. An apparatus for mixing liquid decontaminants and dispensing a foam-based or liquid-based decontaminant, said apparatus comprising:

a plurality of tanks capable of containing liquids;

a pump assembly operating to drain and fill said plurality of tanks, said pump assembly having a plurality of pumps, wherein each pump is in communication with a respective tank, and each pump has a respective drive assembly, said pumps and said drive assemblies aligned in a linear, non-parallel arrangement;

a plurality of couplings connecting each of said drive assemblies of said plurality of pumps to one another in linear series, said couplings and said drive assemblies coaxially aligned with respect to one another, said couplings and said drive assemblies arranged in an alternating sequence such that one each of said couplings connects in series two each of said drive assemblies;

a motor directly connected in linear series to one end of one of said pumps, said motor further connected in linear series to said drive assembly of said one pump such that said motor engages said drive assembly of said one pump, initially drives one of said couplings connected to said drive assembly of said one pump, and further drives said drive assemblies of other said pumps and other said couplings a manifold in communication with said plurality of pumps and said plurality of tanks, said manifold for mixing liquids from said plurality of tanks;

wherein said plurality of pumps are capable of drawing liquids from said plurality of tanks in defined ratios through said pumps to said manifold for mixing and dispensing; and wherein each of said drive assemblies and each of said couplings rotate coaxially with respect to one another.

2. An apparatus according to claim 1, further comprising a unitary drain and fill assembly in communication with said plurality of tanks and said pump assembly; wherein said pump assembly operates to drain and fill said plurality of tanks.

3. An apparatus according to claim 2, wherein said drain and fill assembly comprises:
a plurality of conduits in communication with said plurality of tanks;
a plurality of couplings in communication with said plurality of conduits, each of said plurality of couplings capable of receiving a hose; and
a plurality of valves in communication with said plurality of conduits;
wherein said drain and fill assembly drains and fills said plurality of tanks at each of said respective couplings.

4. An apparatus according to claim 1, further comprising:
a drain assembly in communication with said plurality of tanks, said drain assembly capable of draining said tanks; and
a fill assembly in communication with said plurality of tanks, said fill assembly capable of filling said plurality of tanks.

5. An apparatus according to claim 4, wherein said drain assembly comprises:
a plurality of conduits in communication with said plurality of tanks; and
a plurality of valves in communication with said plurality of conduits;
wherein said pump assembly operates to drain said plurality of tanks by pumping liquids from said tanks.

6. An apparatus according to claim 4, wherein said fill assembly comprises:
a plurality of conduits in communication with said plurality of tanks;
a plurality of couplings in communication with said plurality of conduits, each of said plurality of couplings capable of receiving a hose;
a plurality of valves in communication with said plurality of conduits; and
a plurality of pumps in communication with said couplings, said conduits, and said tanks;
wherein said pumps operate to fill said plurality of tanks by pumping liquids from said couplings through said conduits and to said tanks;
wherein said drain assembly and said fill assembly drains and fills said tanks, respectively, at separate positions along said respective conduits.

7. An apparatus according to claim 6, wherein said pump assembly and said fill assembly are capable of flushing liquid from one of said tanks through said pump assembly, said fill assembly, said conduits, and said manifold.

8. An apparatus according to claim 1, wherein said plurality of pumps are positive displacement diaphragm pumps.

9. An apparatus according to claim 1, wherein said manifold dispenses liquid from one of said plurality of tanks independent of other said tanks.

10. An apparatus according to claim 1, wherein said apparatus is mounted on a vehicle.

11. An apparatus according to claim 1, wherein said apparatus is mounted on a mobile platform.

12. A mobile decontamination module for mixing liquid decontaminants and dispensing a foam-based or liquid-based decontaminant, said module comprising:
a plurality of tanks capable of containing liquids;
a pump assembly having
a first pump in communication with said plurality of tanks, said first pump having a drive assembly,
a second pump in communication with said plurality of tanks, said second pump having a drive assembly, said first and second pumps and said respective drive assemblies aligned in a linear, non-parallel arrangement;
a first coupling positioned immediately between said first and second pumps, said first coupling coaxially aligned with said drive assemblies of said first and second pumps, said first coupling connecting said drive assembly of said first pump directly to said drive assembly of said second pump;
a motor connected in linear series with and solely to said drive assembly of said first pump, such that said motor engages said drive assembly of said first pump and drives said first coupling and said drive assembly of said second pump; and
a manifold in communication with said first and second pumps and said plurality of tanks, said manifold capable of mixing liquids from said plurality of tanks;
wherein said first and second pumps are capable of drawing liquids from said plurality of tanks in defined ratios through said first and second pumps to said manifold for mixing and dispensing; and
wherein said drive assemblies and said first coupling are arranged in linear series such that each of said drive assemblies and said first coupling rotate coaxially with respect to one another.

13. A mobile decontamination module according to claim 12, further comprising a unitary drain and fill assembly in communication with said plurality of tanks and said pump assembly;
wherein said pump assembly operates to drain and fill said plurality of tanks.

14. A mobile decontamination module according to claim 13, wherein said drain and fill assembly comprises:
a plurality of conduits in communication with said plurality of tanks;
a plurality of couplings in communication with said plurality of conduits, each of said plurality of couplings capable of receiving a hose; and
a plurality of valves in communication with said plurality of conduits;
wherein said drain and fill assembly drains and fills said plurality of tanks at each of said respective couplings.

15. A mobile decontamination module according to claim 12, further comprising:
a drain assembly in communication with said plurality of tanks, said drain assembly capable of draining said tanks; and
a fill assembly in communication with said plurality of tanks, said fill assembly capable of filling said plurality of tanks.

16. A mobile decontamination module according to claim 15, wherein said drain assembly comprises:
a plurality of conduits in communication with said plurality of tanks; and
a plurality of valves in communication with said plurality of conduits;
wherein said pump assembly operates to drain said plurality of tanks by pumping liquids from said tanks.

17. A mobile decontamination module according to claim 15, wherein said fill assembly comprises:
a plurality of conduits in communication with said plurality of tanks;
a plurality of couplings in communication with said plurality of conduits, each of said plurality of couplings capable of receiving a hose;

a plurality of valves in communication with said plurality of conduits; and a plurality of pumps in communication with said couplings, said conduits, and said tanks;

wherein said pumps operate to fill said plurality of tanks by pumping liquids from said couplings through said conduits and to said tanks;

wherein said drain assembly and said fill assembly drain and fill said tanks, respectively, at separate positions along said respective conduits.

18. An apparatus according to claim 17, wherein said pump assembly and said fill assembly are capable of flushing liquid from one of said tanks through said pump assembly, said fill assembly, said conduits, and said manifold.

19. A mobile decontamination module according to claim 12, further comprising:

a third pump in communication with said plurality of tanks, said third pump having a drive assembly; and a second coupling connecting said drive assembly of said second pump to said drive assembly of said third pump;

wherein said motor engages said drive assembly of said first pump, such that said motor engages said drive assembly of said first pump and drives said drive assemblies of said first pump, said second pump, and said third pump at the same time.

20. A mobile decontamination module according to claim 12, further comprising:

a platform for supporting said plurality of tanks, said pump assembly, and said manifold;

an enclosure secured to said platform, said enclosure arranged to surround at least a portion of said plurality of tanks;

a retractable boom rotatably mounted at one end to said enclosure, said boom in communication with said plurality of tanks, said pump assembly, and said manifold;

an enclosed cab secured to another end of said boom; and a dispensing nozzle connected to said boom, said dispensing nozzle in communication with said plurality of tanks, said pump assembly, and said manifold;

wherein said platform supporting said enclosure is secured to a vehicle.

21. A mobile decontamination module according to claim 20, wherein said dispensing nozzle is controllable from said enclosed cab.

22. A mobile decontamination module according to claim 12, further comprising a heating system for heating liquids.

23. A mobile decontamination module according to claim 12, further comprising:

a platform for supporting said plurality of tanks, said pump assembly, and said manifold;

a frame secured to said platform, said frame surrounding a portion of said plurality of tanks;

a retractable boom rotatably mounted at one end to said frame, said boom in communication with said plurality of tanks, said pump assembly, and said manifold, said boom being capable of dispensing decontaminants;

a basket secured to another end of said boom; and a dispensing nozzle connected to said boom, said boom dispensing nozzle in communication with said plurality of tanks, said pump assembly, and said manifold.

24. A mobile decontamination module according to claim 23, further comprising:

a plurality of dispensing hoses in communication with said manifold for dispensing decontaminants onto a desired area; and a plurality of reel assemblies secured to said platform for collecting said plurality of dispensing hoses;

wherein said manifold is capable of delivering decontaminants to said boom dispensing nozzle and said plurality of dispensing hoses.

25. A mobile decontamination module according to claim 23, wherein said boom dispensing nozzle is controllable from said basket and said platform.

26. A mobile decontamination module according to claim 23, wherein said platform includes a plurality of rollers for facilitating movement of said platform.

27. A mobile decontamination module according to claim 23, wherein said platform is mounted on a heavy equipment vehicle.

28. An apparatus for mixing liquid decontaminants and dispensing a foam-based or liquid-based decontaminant, said apparatus comprising:

a first tank containing a first liquid;

a second tank containing a second liquid;

a third tank containing a third liquid;

a pump assembly having a plurality of pumps, wherein each pump is in communication with a respective tank, each pump having a respective drive assembly, said pumps and said drive assemblies aligned in a linear, non-parallel arrangement;

a plurality of couplings connecting each of said drive assemblies of said plurality of pumps to one another in linear series, said couplings and said drive assemblies coaxially aligned with respect to one another, said couplings and said drive assemblies arranged in an alternating sequence such that one each of said couplings connects in series two each of said drive assemblies; and a motor directly connected in linear series to one end of one of said pumps, said motor further connected in linear series to said drive assembly of said one pump such that said motor engages said drive assembly of said one pump, initially drives one of said couplings connected to said drive assembly of said one pump, and further drives said drive assemblies of other said pumps and other said couplings;

a manifold in communication with said plurality of pumps and said plurality of tanks, said manifold for mixing liquids from said plurality of tanks; and a unitary drain and fill assembly in communication with said plurality of tanks and said pump assembly, said pump assembly operating to drain and fill said plurality of tanks independent of said manifold;

wherein said plurality of pumps are capable of drawing liquids from said plurality of tanks in defined ratios through said pumps to said manifold for mixing and dispensing; and wherein each of said drive assemblies and each of said couplings rotate coaxially with respect to one another.

* * * * *